(12) United States Patent
Roblek et al.

(10) Patent No.: US 10,467,493 B2
(45) Date of Patent: Nov. 5, 2019

(54) OBJECT DETECTION USING NEURAL NETWORK SYSTEMS

(71) Applicant: Google LLC, Mountain View, CA (US)

(72) Inventors: Dominik Roblek, Meilen (CH); Christian Szegedy, Mountain View, CA (US); Jacek Slawosz Jurewicz, Zurich (CH)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/650,790

(22) Filed: Jul. 14, 2017

(65) Prior Publication Data

US 2019/0019050 A1 Jan. 17, 2019

(51) Int. Cl.
| | | |
|---|---|---|
| *G06K 9/32* | (2006.01) | |
| *G06T 7/11* | (2017.01) | |
| *G06K 9/46* | (2006.01) | |
| *G06K 9/66* | (2006.01) | |
| *G06N 3/08* | (2006.01) | |
| *G06K 9/62* | (2006.01) | |

(52) U.S. Cl.
CPC ......... *G06K 9/3241* (2013.01); *G06K 9/4628* (2013.01); *G06K 9/6271* (2013.01); *G06K 9/66* (2013.01); *G06N 3/08* (2013.01); *G06T 7/11* (2017.01)

(58) Field of Classification Search
CPC ...... G06K 9/3241; G06K 9/66; G06K 9/4628; G06N 3/08; G06T 7/11
See application file for complete search history.

(56) References Cited

U.S. PATENT DOCUMENTS

| | | | | |
|---|---|---|---|---|
| 9,373,057 | B1* | 6/2016 | Erhan | G06K 9/6202 |
| 10,007,867 | B2* | 6/2018 | Yu | G06K 9/3258 |
| 2007/0292047 | A1* | 12/2007 | Jiao | G06F 17/153 |
| | | | | 382/279 |
| 2016/0196479 | A1* | 7/2016 | Chertok | G06K 9/6272 |
| | | | | 382/156 |

OTHER PUBLICATIONS

Szegedy et al., "Going Deeper with Convolutions," (Sep. 17, 2014) [online] (retrieved from https://arxiv.org/pdf/1409.4842.pdf), 12 pages.

(Continued)

*Primary Examiner* — John W Lee
(74) *Attorney, Agent, or Firm* — Fish & Richardson P.C.

(57) ABSTRACT

Systems, methods, and apparatus, including computer programs encoded on a computer storage medium. In one aspect, a system includes initial neural network layers configured to: receive an input image, and process the input image to generate a plurality of first feature maps that characterize the input image; a location generating convolutional neural network layer configured to perform a convolution on the representation of the first plurality of feature maps to generate data defining a respective location of each of a predetermined number of bounding boxes in the input image, wherein each bounding box identifies a respective first region of the input image; and a confidence score generating convolutional neural network layer configured to perform a convolution on the representation of the first plurality of feature maps to generate a confidence score for each of the predetermined number of bounding boxes in the input image.

18 Claims, 5 Drawing Sheets

(56) References Cited

OTHER PUBLICATIONS

Krizhevsky et al. "ImageNet Classification with Deep Convolutional Neural Networks," Advances in Neural Information Processing Systems, 25, Jan. 1, 2012, 9 pages.
PCT International Search Report and Written Opinion issued in International Application No. PCT/US2018/042143, dated Nov. 29, 2018, 15 pages.
Redmon et al. "You Only Look Once: Unified, Real-Time Object Detection, IEEE Conference on Computer Vision and Pattern Recognition," Jun. 27, 2016, 10 pages.

* cited by examiner

OBJECT DETECTION USING NEURAL NETWORK SYSTEMS

BACKGROUND

This specification relates to object detection in images using neural network systems.

Neural networks are machine learning models that employ one or more layers of nonlinear units to predict an output for a received input. Some neural networks include one or more hidden layers in addition to an output layer. The output of each hidden layer is used as input to another layer in the network, i.e., the next hidden layer or the output layer. Each layer of the network generates an output from a received input in accordance with current values of a respective set of parameters.

SUMMARY

In general, one innovative aspect of the subject matter described in this specification can be embodied in systems that include one or more initial neural network layers, wherein the one or more initial neural network layers are configured to: receive an input image, and process the input image to generate a plurality of first feature maps that characterize the input image, wherein: the plurality of first feature maps are each of the same size, each of the plurality of first feature maps have a respective value at each of a plurality of first feature map locations, and each of the plurality of first feature map locations correspond to a respective first region in the input image; a location generating convolutional neural network layer, wherein the location generating convolutional neural network layer is configured to: receive a representation of the first plurality of feature maps, and perform a convolution on the representation of the first plurality of feature maps to generate data defining a respective location of each of a predetermined number of bounding boxes in the input image, wherein each bounding box identifies a respective first region of the input image; and a confidence score generating convolutional neural network layer, wherein the confidence score generating convolutional neural network layer is configured to: receive the representation of the first plurality of feature maps; and perform a convolution on the representation of the first plurality of feature maps to generate a confidence score for each of the predetermined number of bounding boxes in the input image.

The foregoing and other embodiments can each optionally include one or more of the following features, alone or in combination. In particular, one embodiment includes all the following features in combination.

In some implementations, the system includes one or more regional convolutional neural network layers that are configured to process the first plurality of feature maps to generate a second plurality of feature maps that are the representation of the first plurality of feature maps, wherein each spatial location in each of the second plurality of feature maps corresponds to a second region in the input image that includes a plurality of first regions in the input image.

In some implementations, the one or more regional convolutional neural network layers include one or more horizontal neural network layers that each perform a 1×2 convolution on data values from the first plurality of feature maps or from a preceding regional convolutional neural network layer, wherein the depth of the one or more horizontal neural network layers is equal to j−1; and one or more vertical neural network layers that each perform a 2×1 convolution on data values from the first plurality of feature maps or from a preceding convolutional neural network layer, wherein the depth of the one or more vertical neural network layers is equal to k−1.

In some implementations, the one or more initial neural network layers comprise one or more layers of a convolutional neural network.

In some implementations, the convolution performed by the location generating convolutional neural network is a 1×1×4 convolution.

In some implementations, the convolution performed by the confidence score generating convolutional neural network is a 1×1×1 convolution.

Other embodiments of this aspect include methods that perform the actions of one or more of the one or more initial neural network layers, the location generating convolutional neural network layer, the confidence score generating convolutional neural network layer, and the one or more regional convolutional neural network layers. Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

Particular embodiments of the subject matter described in this specification can be implemented so as to realize one or more of the following advantages. A neural network system as described in this specification can effectively predict objects in an input image while using fewer computing resources than existing solutions. That is, the neural network system has a neural network architecture that is less resource-intensive than other neural network-based systems. For example, the neural network system described in this specification generates location data from outputs of an initial set of neural network layers using only convolutional neural network layers, e.g., as opposed to fully-connected or other more resource-intensive kinds of neural network layers, reducing the amount of computing resources required to generate an effective prediction for an input image. Thus, such a neural network system can be implemented on resource-constrained devices, e.g., mobile phones, tablets, or other mobile devices.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
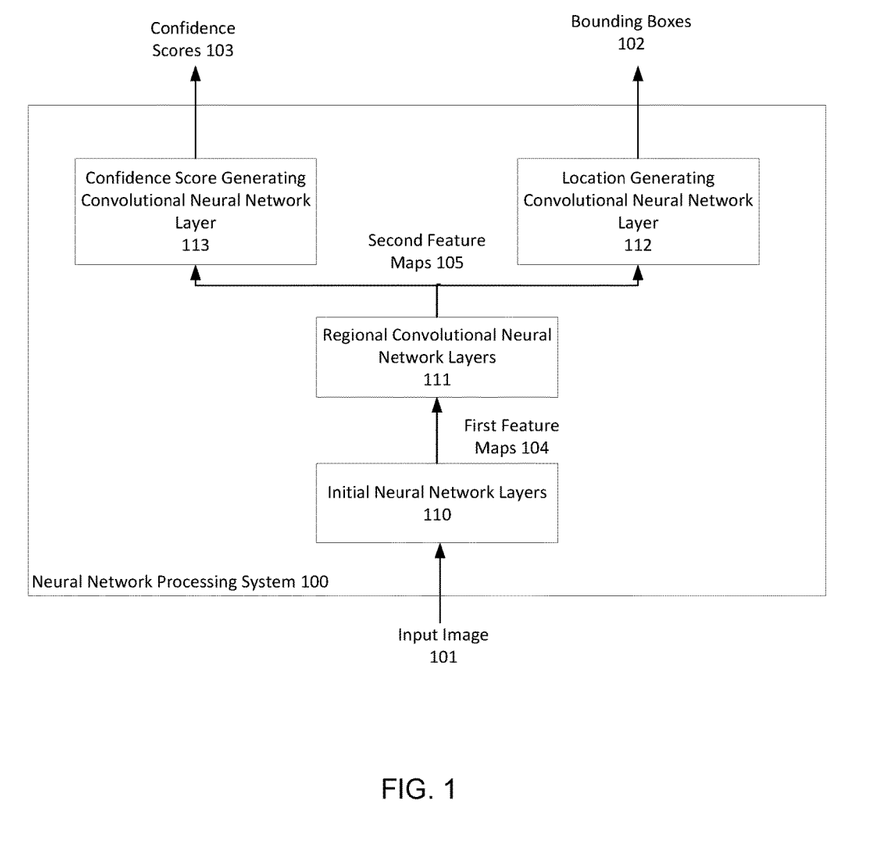
FIG. 1 shows an example neural network processing system.

FIG. 1 shows an example neural network processing system 100. The neural network processing system 100 is an example of a system implemented as computer programs on one or more computers in one or more locations, in which the systems, components, and techniques described below are implemented.

The neural network processing system 100 can be used to detect one or more objects in an input image 101. The neural network processing system 100 processes the input image 101 to generate data defining multiple bounding boxes 102 in the input image 101 and a confidence score 103 for each bounding box 102.

Each bounding box 102 is a region in the input image 101. In some implementations, the data defining the bounding boxes 102 defines each bounding box by the coordinates of the vertices of the respective bounding box 102 in the input image 101. In some other implementations, the data defining the bounding boxes 102 defines each bounding box by the position, magnitude, and direction of vectors that correspond to the edges of the respective bounding box 102 in the input image 101.

The confidence score 103 for a bounding box 102 represents a likelihood that the bounding box 102 includes an image of an object. For instance, a high confidence score 103 for a bounding box 102 can indicate that the bounding box 102 likely contains an object, while a low confidence score 103 for a bounding box 102 can indicate that the bounding box 102 likely does not contain an image of an object.

The neural network processing system 100 includes one or more initial neural network layers 110, one or more location generating convolutional neural network layers 112, and one or more confidence score generating convolutional neural network layers 113. The neural network processing system 100 may also optionally include one or more regional convolutional neural network layers 111.

The initial neural network layers 110 are configured to receive the input image 101 and process the input image 101 to generate a number of first feature maps 104.

Generally, the initial neural network layers 110 include one or more convolutional neural network layers. In some of those implementations, the initial neural network layers 110 have an architecture corresponding to a portion of a convolutional neural network, e.g., a portion of a neural network having an Inception architecture for convolutional neural networks. Examples of the Inception architecture are described in Szegedy et al., "Going Deeper with Convolutions," at https://arxiv.org/pdf/1409.4842.pdf.

Each of the first feature maps 104 has the same spatial dimensions and each spatial location in a first feature map corresponds to a respective region of the input image 101. Some regions in the input image 101 may overlap with other regions in the input image 101. As a simplified example, if no regions in the first feature maps 104 overlap with other regions in the first feature maps 104, when each first feature map has a dimension n×n and the input image 101 has a dimension k×k, each spatial location in a first feature map corresponds to a different k/n×k/n cell in the input image 101. The regions in the input image 101 that correspond to spatial locations in the first feature maps will be referred to in this specification as unit regions.

The neural network processing system 100 is configured to generate data defining bounding boxes in the input image that have multiple different sizes. While, in some implementations, one of the sizes is the same size as the unit regions, one or more of the bounding box sizes may be different from the sizes of the unit regions.

In particular, each bounding box defined by the output of the neural network processing system 100 corresponds to a different predetermined region in the input image 101, i.e., a region having a predetermined location and size, from a set of predetermined regions. Such predetermined regions will be referred to in this specification as "prior bounding boxes." That is, each bounding box defined by the output has the same size as the corresponding prior bounding box and the data defining the bounding box defines the location of the bounding box relative to the corresponding bounding box. For example, the data can define a location of the vertex of each bounding box relative to the corresponding vertex of the corresponding bounding box. The prior bounding boxes in the set of prior of bounding boxes may have different sizes at least some of which are not the same as the size of the unit regions.

Therefore, for each set of bounding that has a particular size that exceeds the size of a unit region, the neural network processing system 100 performs further processing on each first feature map 104 to generate a number of second feature maps 105. Each spatial location in a second feature map 105 corresponds to a region having the particular size, i.e., the same size as a prior bounding boxes. The neural network processing system 100 performs this task using the regional convolutional neural network layers 111.

In some implementations, each spatial location in in each of the second feature maps 105 corresponds to the size and location of a prior bounding box and represents a region of an image corresponding to a j*k patch of the first feature maps 104, where either j>1, k>1, or both. Transforming first feature maps 104 to second feature maps 105 using the regional convolutional neural network layers 111 is described in greater detail below with reference to FIG. 2.

The location generating convolutional neural network layers 112 and the confidence score generating convolutional neural network layers 113 receive a representation of the first feature maps 104 and process the representation to generate the bounding box locations 102 and the confidence scores 103 respectively. In other words, the location generating convolutional neural network layers 112 and the confidence score generating convolutional neural network layers 113 transform the depth of the first feature maps 104.

Generating the bounding boxes 102 using the location generating convolutional neural network layer 112 is described in greater detail below with reference to FIG. 3. Generating the confidence scores 103 using the confidence score generating convolutional neural network layer 113 is described in greater detail below with reference to FIG. 4.

Figure 2:
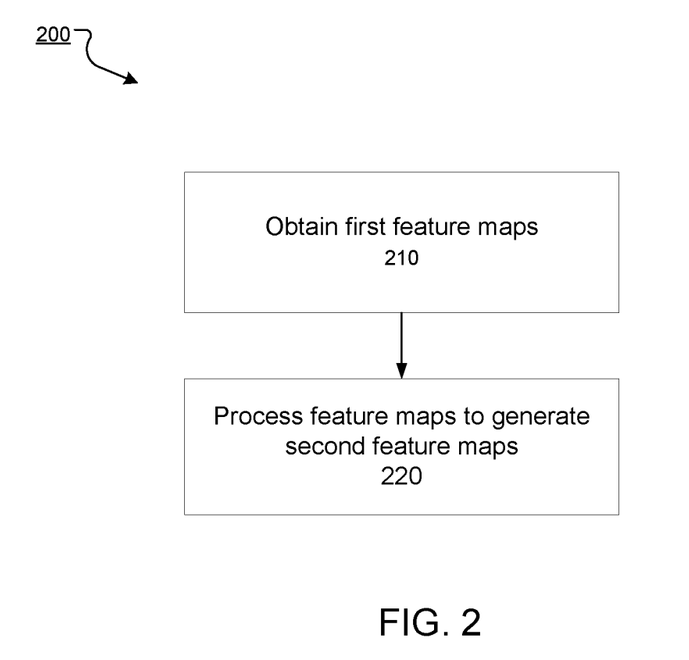
FIG. 2 is an example process for transforming heat maps using one or more regional convolutional neural network layers.

The representation of the first feature maps 104 can depend on the size of prior bounding boxes defined by the output of the neural network processing system 100. When the neural network processing systems 100 generates output defining bounding boxes that have the same size as unit regions of the first feature maps 104, the representation of the first feature maps 104 are the first feature maps 104 themselves. When the neural network processing systems 100 generates output defining bounding boxes that are larger than unit regions, the representation of the first feature maps 104 are second feature maps that have spatial locations that correspond to regions in the image that are the same size as the prior bounding boxes. FIG. 2 is an example process 200 for transforming feature maps using one or more regional convolutional neural network layers. For convenience, the process 200 will be described as being performed by a system of one or more computers located in one or more locations. For example, a neural network processing system, e.g., the neural network processing system 100 of FIG. 1, appropriately programmed in accordance with this specification, can perform the process 200.

The system performs the process 200 to transform a group of first feature maps to new feature maps that have values corresponding to prior bounding boxes of a particular size that are larger than a unit region of the first feature maps.

The system can repeat the process 200 for each different bounding box size that is larger than a unit region to generate a set of second feature maps that that have spatial locations that correspond to regions in the image that are the same size as the prior bounding boxes.

The system obtains the first feature maps (210). The first feature maps may be generated by one or more initial neural network layers (e.g., the initial neural network layers 110 of FIG. 1).

The system processes the first feature maps through a sequence of one or more regional convolutional neural network layers to generate the second feature maps (220). The structure and arrangement of the regional convolutional neural network layers in the sequence depend on the size of the prior bounding boxes, i.e., the applied convolutions will be different for different sized prior bounding boxes.

In some implementations, the regional convolutional neural network layers convert each first feature map to a second feature map that have spatial locations that correspond to regions in the image that are the same size as the prior bounding boxes.

The one or more regional convolutional neural network layers include one layer for each of the sequence of one or more convolutions performed by the layers. Generally, the sequence of one or more convolutions may include one or more 1×2 convolutions each performed by a respective horizontal neural network layer and one or more 2×1 convolutions each performed by a respective vertical horizontal neural network layer.

The regional convolutional neural network layers preserve the total number of feature maps. In other words, the same sequence of convolutions is applied to each first feature map to generate a corresponding second feature map.

The number of vertical and horizontal neural network layers needed to generate second feature maps for an input image region corresponding to a j*k patch of the first feature maps (where j>0, k>0, or both) may depend on the size of the patch (i.e., on j and k). In some implementations, where j is the horizontal length of the patch and k is the vertical length of the patch, the system can generate second feature maps for an input image region corresponding to a j*k patch of the first feature maps using at least j−1 horizontal neural network layers and k−1 vertical neural network layers.

For instance, if an image region covers a 3*2 patch of the first feature maps, the system can perform two 1×2 and one 2×1 convolutions on the first feature map sequentially to develop the second feature maps. This means that the regional convolutional neural network layers can include two horizontal neural network layers and a vertical neural network layer.

The noted layers can be placed in any order so long as the system performs two 1×2 convolutions and one 2×1 convolutions in a sequential manner. In one ordering, for instance, the system can process the first feature maps through a first horizontal neural network layer, then process the output of the first horizontal neural network layer through a second horizontal neural network layer, and afterward process the output of the second horizontal neural network layer through a vertical neural network layer to generate corresponding second feature maps.

In another ordering, the system can process the first feature maps through a first horizontal neural network layer, then process the output of the first horizontal neural network layer through a vertical neural network layer, and then process the output of the vertical neural network layer through a second horizontal neural network layer to generate corresponding second feature maps.

In some implementations, the system processes the first feature maps through multiple orderings, e.g., all possible orderings, of the horizontal layers and vertical layers needed to transform the feature map based on the size of prior bounding boxes. The system computes a measure of central distribution, e.g., an average, of the values corresponding to each prior bounding box determined based on the multiple orderings. The system then uses each measure of central distribution for a prior bounding box as the value in the second feature maps corresponding to the prior bounding box.

Figure 5:
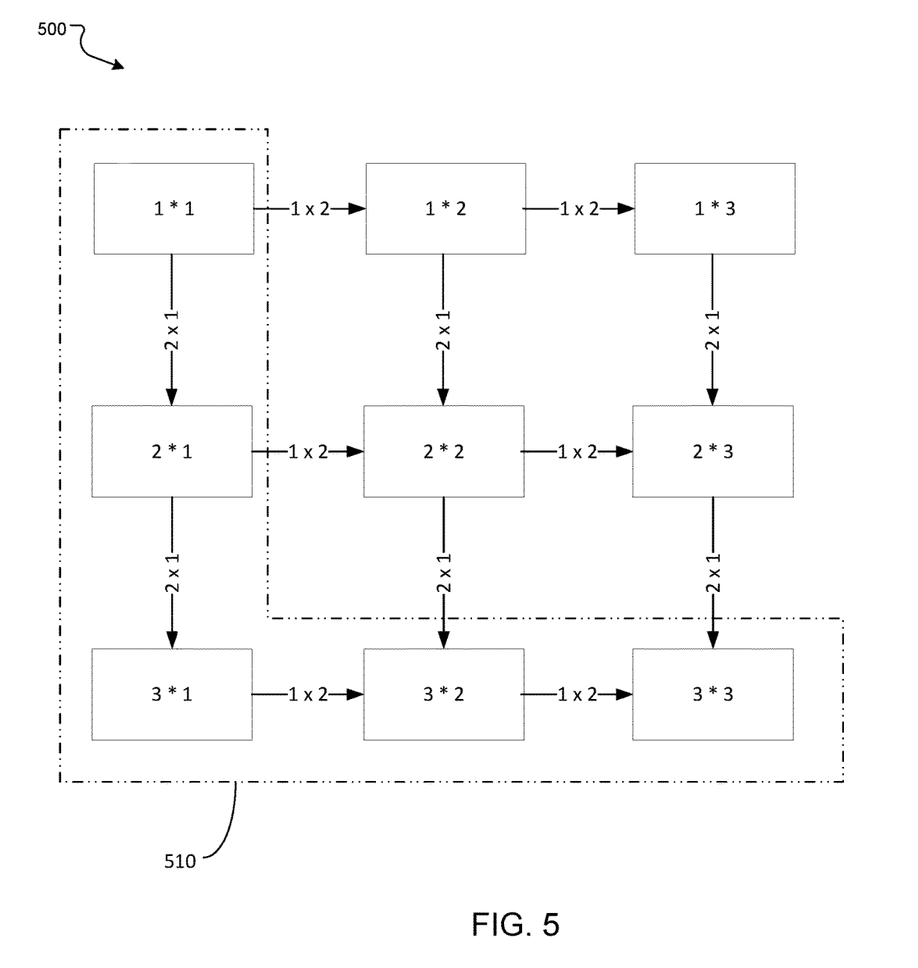
FIG. 5 is a graph illustrating an example configuration of regional convolutional neural network layers that include horizontal and vertical neural network layers.

An example configuration of regional convolutional neural network layers that include horizontal and vertical neural network layers is illustrated in FIG. 5.

Figure 3:
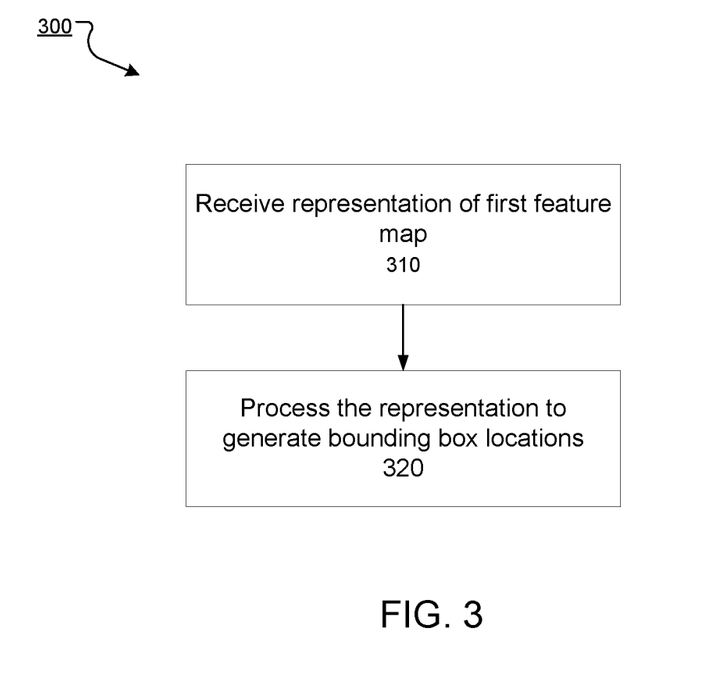
FIG. 3 is an example process for generating bounding box locations using a location generating neural network layer.

FIG. 3 is an example process 300 for generating bounding box locations using a location generating neural network layer. For convenience, the process 300 will be described as being performed by a system of one or more computers located in one or more locations. For example, a neural network processing system, e.g., the neural network processing system 100 of FIG. 1, appropriately programmed in accordance with this specification, can perform the process 300.

The system obtains a representation of first feature maps (310).

The representation of the first feature maps can depend on the size of prior bounding boxes defined by the output of the system. When the system generates output defining bounding boxes that have the same size as unit regions of the first feature maps, the representation of the first feature maps are the first feature maps themselves. When the neural network processing systems generates output defining bounding boxes that have a larger as unit regions, the representation of the first feature maps are second feature maps that have spatial locations that correspond to regions in the image that are the same size as the prior bounding boxes.

The system performs a convolution on the representation of the feature maps to generate data defining location of each of a predetermined number of bounding boxes in an input image (320). Each bounding box identifies a region of the input image that can correspond to a location and a size of a prior bounding box. In other words, each bounding box defined by the output has a size that is similar to the size of the corresponding prior bounding box and the data defining the bounding box defines the location of the bounding box relative to the corresponding prior bounding box. The data can define a location of the vertex of each bounding box relative to the corresponding vertex of the corresponding bounding box. For example, if the location of a prior bounding box is represented by a vector $\{x, y, w, h\}$ where x and y are coordinates of a reference point of the prior bounding box, e.g., of a particular vertex of the bounding box or of the center of the bounding box, w is a width of the prior bounding box, and h is a height of a the prior bounding box, and the absolute location of a corresponding bounding box is represented by a vector {x', y', w', h'} where x' and y's are coordinates of the reference point of the bounding box, w' is a width of the bounding box, and h' is a height of a the prior bounding box, the generated data defining the location of the corresponding bounding box can be a vector that includes deltas between the values representing the absolute locations of the two bounding boxes, e.g., {(x−x'), (y−y'), (w−w'), (h−h')). The prior bounding boxes in the set of prior of bounding boxes may have different sizes at least some of which are not the same as the size of the unit regions.

The system performs a 1×1×4 convolution on the representation of the first feature maps to generate data defining location of bounding boxes in the input image. The output of this convolution can for instance be four values defining coordinates of four vertices of a quadrilateral bounding box corresponding to a region of the input image. The 1×1×4 convolution can be a <height>×<width>×<channels>convolution.

Figure 4:
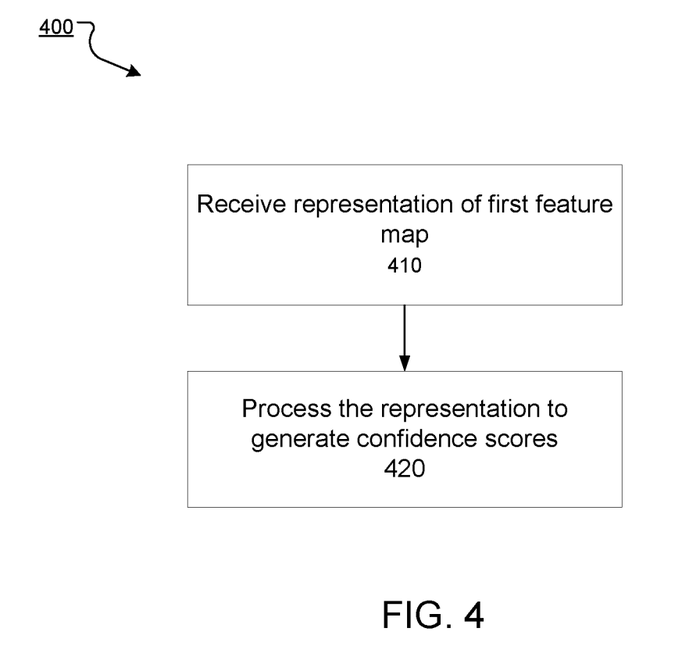
FIG. 4 is an example process for generating confidence score values using a confidence score generating neural network layer.

FIG. 4 is an example process 400 for generating confidence score values using a confidence score generating neural network layer. For convenience, the process 400 will be described as being performed by a system of one or more computers located in one or more locations. For example, a neural network processing system, e.g., the neural network processing system 100 of FIG. 1, appropriately programmed in accordance with this specification, can perform the process 400.

The system obtains a representation of first feature maps (310). The representation of the first feature maps may be the feature maps themselves. In some implementations, the representation of the first feature maps are second feature maps produced by one or more regional convolutional neural network layers.

The system performs a convolution on the representation of the feature maps to generate a confidence score for each bounding box corresponding to an input image region (320).

In some implementations, the system performs a 1×1×1 convolution on the representation of the first feature maps to generate confidence scores. The 1×1×1 convolution can be a <height>×<width>×<channels>convolution.

FIG. 5 is a graph 500 illustrating an example configuration of regional convolutional neural network layers that include horizontal and vertical neural network layers. Each horizontal or vertical neural network layer can be a convolutional neural network layer.

In graph 500, the edges of the graph represent regional convolutional neural network layers the horizontal and vertical neural network layers, while the vertices of the graph represent an input to a regional convolutional neural network layer, an output of a regional convolutional neural network layer, or both.

A neural network processing system (e.g., the neural network processing system 100 of FIG. 1) can take a first feature map and transform it to a second feature map using any viable path for such transformation provided by the graph 500. For instance, the system can convert the first feature map to a second feature map in which each value corresponds to an input image region identified by a 3*3 patch of the first feature map by any paths for going from the source of the graph 500 to the edge identifying a 3*3 output, including path 510.

Path 510 includes processing each first feature map through a first vertical neural network layer, processing the output of the first vertical neural network through a second vertical neural network layer, processing the output of the second vertical neural network through a fifth horizontal neural network layer, and processing the output of the fifth horizontal neural network layer through a sixth horizontal neural network layer to generate a corresponding second feature map.

An alternative path in the graph 500 can include processing each first feature map through a first horizontal neural network layer, processing the output of the first horizontal neural network through a third vertical neural network layer, processing the output of the third vertical neural network through a fourth vertical neural network layer, and processing the output of the fourth vertical neural network layer through a sixth horizontal neural network to generate a corresponding second feature map.

Each horizontal or vertical neural network layer can produce an output having multiple channels that it supplies as an input to its neighboring neural network layers. In some implementations, the number of channels of output produced by a layer and supplied to a neighboring layer can depend on the total number of layers that provide inputs to the neighboring layer. For example, each horizontal or vertical neural network layer may generate a fraction of N output channels for a neighboring layer, where N is greater than 1 and is the total number of channels of input received by each horizontal or vertical neural network layer, N is a constant for all horizontal or vertical neural network layers. In other words, the number of channels outputted by each first layer to each second layer depends on the total number of layers that provide inputs to the second layer. Each layer can concatenate the input channels it receives from one or more neighboring layers to generate its respective input having N channels. Thus, if the neighboring layer to a particular layer receives input channels from two layers, the particular layer will provide N/2 input channels to the layer, while if the neighboring layer to a particular layer receives inputs from the particular layer only, the particular layer will provide N input channels to the layer.

A system of one or more computers, e.g., the neural network processing system 100 of FIG. 1, can perform the processes 200, 300, and 400 for neural network inputs for which the desired output, i.e., the output image that should be generated by the system for the input, is not known.

The system can also perform the processes 200, 300, and 400 on neural network inputs in a set of training data, i.e., a set of inputs for which the output image that should be generated by the system is known, in order to train the initial neural network layers, the location generating neural network layers, and the confidence score generating neural network layers, i.e., to determine trained values for the parameters of the layers. The processes 200, 300, and 400 can be performed repeatedly on inputs selected from a set of training data as part of a conventional machine learning training technique to train the layers, e.g., a stochastic gradient descent with backpropagation training technique.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse, a trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A system for detecting objects in input images, the system comprising:
   one or more initial neural network layers, wherein the one or more initial neural network layers are configured to:
      receive an input image, and
      process the input image to generate a plurality of first feature maps that characterize the input image, wherein:
         the plurality of first feature maps are each of the same size,
         each of the plurality of first feature maps have a respective value at each of a plurality of first feature map locations, and
         each of the plurality of first feature map locations correspond to a respective first region in the input image;
   a location generating convolutional neural network layer, wherein the location generating convolutional neural network layer is configured to:
      receive a representation of the first plurality of feature maps, and
      perform a convolution on the representation of the first plurality of feature maps to generate data defining a respective location of each of a plurality of bounding boxes in the input image, wherein each bounding box corresponds to a different prior bounding box of a predetermined number of prior bounding boxes in the input image, wherein the predetermined number of prior bounding boxes includes prior bounding boxes of multiple different sizes within the input image, and wherein the data defining the respective location of each of the plurality of bounding boxes in the input image identifies the location of the bounding box relative to the location of the corresponding prior bounding box; and
   a confidence score generating convolutional neural network layer, wherein the confidence score generating convolutional neural network layer is configured to:
      receive the representation of the first plurality of feature maps; and
      perform a convolution on the representation of the first plurality of feature maps to generate a respective confidence score for each of the plurality of bounding boxes in the input image that represents a likelihood that the bounding box includes an image of an object.

2. The system of claim 1, further comprising:
   one or more regional convolutional neural network layers that are configured to process the first plurality of feature maps to generate a second plurality of feature maps that are the representation of the first plurality of feature maps, wherein each spatial location in each of the second plurality of feature maps represents a second region in the input image that includes a plurality of first regions in the input image and that corresponds to a respective prior bounding box from the predetermined number of prior bounding boxes in the input image.

3. The system of claim 2, wherein the one or more regional convolutional neural network layers comprise:
   one or more horizontal neural network layers that each perform a 1×2 convolution on data values from the first plurality of feature maps or from a preceding regional convolutional neural network layer, wherein the depth of the one or more horizontal neural network layers is equal to j−1 ; and
   one or more vertical neural network layers that each perform a 2×1 convolution on data values from the first plurality of feature maps or from a preceding convolutional neural network layer, wherein the depth of the one or more vertical neural network layers is equal to k−1.

4. The system of claim 1, wherein the one or more initial neural network layers comprise one or more layers of a convolutional neural network.

5. The system of claim 1, wherein the convolution performed by the location generating convolutional neural network is a 1×1×4 convolution on the representation of the first feature maps to generate, for each of the prior bounding boxes, four values defining coordinates of four vertices of a bounding box corresponding to the prior bounding box.

6. The system of claim 1, wherein the convolution performed by the confidence score generating convolutional neural network is a 1×1×1 convolution on the representation of the first feature maps to generate a single valued confidence score.

7. A method comprising:
receiving, by one or more initial neural network layers, an input image;
processing, by the one or more initial neural network layers, the input image to generate a plurality of first feature maps that characterize the input image, wherein:
the plurality of first feature maps are each of the same size,
each of the plurality of first feature maps have a respective value at each of a plurality of first feature map locations, and
each of the plurality of first feature map locations correspond to a respective first region in the input image;
perform a convolution on the representation of the first plurality of feature maps to generate data defining a respective location of each of a plurality of bounding boxes in the input image, wherein each bounding box corresponds to a different prior bounding box of a predetermined number of prior bounding boxes in the input image, wherein the predetermined number of prior bounding boxes includes prior bounding boxes of multiple different sizes within the input image, and wherein the data defining the respective location of each of the plurality of bounding boxes in the input image identifies the location of the bounding box relative to the location of the corresponding prior bounding box; and
performing, by a confidence score generational convolutional neural network layer, a convolution on the representation of the first plurality of feature maps to generate a respective confidence score for each of the plurality of bounding boxes in the input image that represents a likelihood that the bounding box includes an image of an object.

8. The method of claim 7, further comprising:
one or more regional convolutional neural network layers that are configured to process the first plurality of feature maps to generate a second plurality of feature maps that are the representation of the first plurality of feature maps, wherein each spatial location in each of the second plurality of feature maps represents a second region in the input image that includes a plurality of first regions in the input image and that corresponds to a respective prior bounding box from the predetermined number of prior bounding boxes in the input image.

9. The method of claim 8, wherein the one or more regional convolutional neural network layers comprise:
one or more horizontal neural network layers that each perform a 1×2 convolution on data values from the first plurality of feature maps or from a preceding regional convolutional neural network layer, wherein the depth of the one or more horizontal neural network layers is equal to j−1 ; and
one or more vertical neural network layers that each perform a 2×1 convolution on data values from the first plurality of feature maps or from a preceding convolutional neural network layer, wherein the depth of the one or more vertical neural network layers is equal to k−1.

10. The method of claim 7, wherein the one or more initial neural network layers comprise one or more layers of a convolutional neural network.

11. The method of claim 7, wherein the convolution performed by the location generating convolutional neural network is a 1×1×4 convolution on the representation of the first feature maps to generate, for each of the prior bounding boxes, four values defining coordinates of four vertices of a bounding box corresponding to the prior bounding box.

12. The method of claim 7, wherein the convolution performed by the confidence score generating convolutional neural network is a 1×1×1 convolution on the representation of the first feature maps to generate a single valued confidence score.

13. A computer storage medium encoded on one or more non-transitory computer storage media, the computer program product comprising instructions that when executed by one or more computers cause the one or more computers to perform operations comprising:
receiving, by one or more initial neural network layers, an input image;
processing, by the one or more initial neural network layers, the input image to generate a plurality of first feature maps that characterize the input image, wherein:
the plurality of first feature maps are each of the same size,
each of the plurality of first feature maps have a respective value at each of a plurality of first feature map locations, and
each of the plurality of first feature map locations correspond to a respective first region in the input image;
perform a convolution on the representation of the first plurality of feature maps to generate data defining a respective location of each of a plurality of bounding boxes in the input image, wherein each bounding box corresponds to a different prior bounding box of a predetermined number of prior bounding boxes in the input image, wherein the predetermined number of prior bounding boxes includes prior bounding boxes of multiple different sizes within the input image, and wherein the data defining the respective location of each of the plurality of bounding boxes in the input image identifies the location of the bounding box relative to the location of the corresponding prior bounding box; and
performing, by a confidence score generational convolutional neural network layer, a convolution on the representation of the first plurality of feature maps to generate a respective confidence score for each of the plurality of bounding boxes in the input image that represents a likelihood that the bounding box includes an image of an object.

14. The computer storage medium of claim 13, further comprising:
one or more regional convolutional neural network layers that are configured to process the first plurality of feature maps to generate a second plurality of feature maps that are the representation of the first plurality of feature maps, wherein each spatial location in each of the second plurality of feature maps represents a second region in the input image that includes a plurality of first regions in the input image and that corresponds to a respective prior bounding box from the predetermined number of prior bounding boxes in the input image.

15. The computer storage medium of claim 14, wherein the one or more regional convolutional neural network layers comprise:
one or more horizontal neural network layers that each perform a 1×2 convolution on data values from the first plurality of feature maps or from a preceding regional convolutional neural network layer, wherein the depth of the one or more horizontal neural network layers is equal to j−1; and
one or more vertical neural network layers that each perform a 2×1 convolution on data values from the first plurality of feature maps or from a preceding convolutional neural network layer, wherein the depth of the one or more vertical neural network layers is equal to k−1.

16. The computer storage medium of claim 13, wherein the one or more initial neural network layers comprise one or more layers of a convolutional neural network.

17. The computer storage medium of claim 13, wherein the convolution performed by the location generating convolutional neural network is a 1×1×4 convolution on the representation of the first feature maps to generate, for each of the prior bounding boxes, four values defining coordinates of four vertices of a bounding box corresponding to the prior bounding box.

18. The computer storage medium of claim 13, wherein the convolution performed by the confidence score generating convolutional neural network is a 1×1×1 convolution on the representation of the first feature maps to generate a single valued confidence score.

* * * * *

UNITED STATES PATENT AND TRADEMARK OFFICE
CERTIFICATE OF CORRECTION

PATENT NO. : 10,467,493 B2
APPLICATION NO. : 15/650790
DATED : November 5, 2019
INVENTOR(S) : Roblek et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 58 days.

Signed and Sealed this
Twenty-first Day of July, 2020

Andrei Iancu
*Director of the United States Patent and Trademark Office*